April 28, 1964  N. V. SMITH ETAL  3,130,818
INTERMITTENT PRESSURE INJECTOR

Filed Feb. 8, 1960  3 Sheets-Sheet 1

INVENTORS
NEIL V. SMITH
GUY S. MAHAN

BY Price and Heneveld

ATTORNEYS

INVENTORS
NEIL V. SMITH
GUY S. MAHAN

United States Patent Office 3,130,818
Patented Apr. 28, 1964

3,130,818
INTERMITTENT PRESSURE INJECTOR
Neil V. Smith, La Canada, Calif., and Guy S. Mahan, Hudson, Ohio, assignors to International Basic Economy Corporation, New York, N.Y., a corporation of New York
Filed Feb. 8, 1960, Ser. No. 7,165
5 Claims. (Cl. 184—29)

This invention relates to an intermittent pressure injector, and more particularly to an injector which will provide a measured portion of liquid to a flow line each time the injector is subjected to a pressure increase.

Oftentimes the only practical way of lubricating certain pneumatic tools is to combine the lubricant with the air or fluid which is used to operate or actuate the tool. Various types of air line lubricators are used to provide such lubrication. The majority of air line lubricators used for this purpose are of the type which continually supply the air stream flowing through the lubricator with a small amount of lubricant. Although this type of lubricator has various devices for regulating the amount of lubricant supplied to the air stream, they all have the tendency to overlubricate the pneumatic tool, resulting in wasted lubrication.

With the intermittent pressure injector disclosed herein, the pneumatically operated device is supplied initially with a measured portion of oil, and is not again supplied with lubricant until the pneumatic device is again initially actuated. With this type of operation, the pneumatically operated device is supplied with a sufficient amount of lubricant, and at the same time is not overlubricated.

Although this is one application of the injector, it can be used equally well for other purposes. This same injector might be used for injecting alcohol into a gas line to prevent icing. The injector in this environment can be controlled by a timer actuated valve which applies pressure to the valve at predetermined intervals.

An object of this invention is to provide an intermittent pressure injector which can be adapted for use with any type of fluid operated device.

Still another object of this invention is to provide an intermittent pressure injector which is operated by bleed fluid from the supply stream before it enters the fluid operated device.

Still another object of this invention is to provide an intermittent pressure injector which, when initially actuated, will remain inoperative until another pressure cycle is again encountered.

Another object of this invention is to provide an intermittent pressure injector which can be regulated to discharge predetermined amounts of fluid into the flow stream upon each energization of the fluid operated device.

Another object of this invention is to provide an intermittent pressure injector which can be regulated to discharge predetermined amounts of fluid into a flow stream at predetermined intervals as controlled by a cycling device.

These and other objects and purposes of this invention will become apparent upon reading the following specification in conjunction with the accompanying drawings wherein.

Basically, the invention contemplates an injector for a fluid operated mechanism comprising a piston and plunger arrangement operated by fluid bled off from a point in the fluid path. When a control valve is opened, the piston drives the plunger into a position where it traps a quantity of liquid from a reservoir in a chamber and then forces it out of that chamber into an atomizer which atomizes the liquid into the flow stream which operates the device. When the control valve is shifted, a spring returns the plunger to its initial position where liquid is admitted into the plunger chamber from the reservoir to ready the device for the next cycle.

Figure 2:
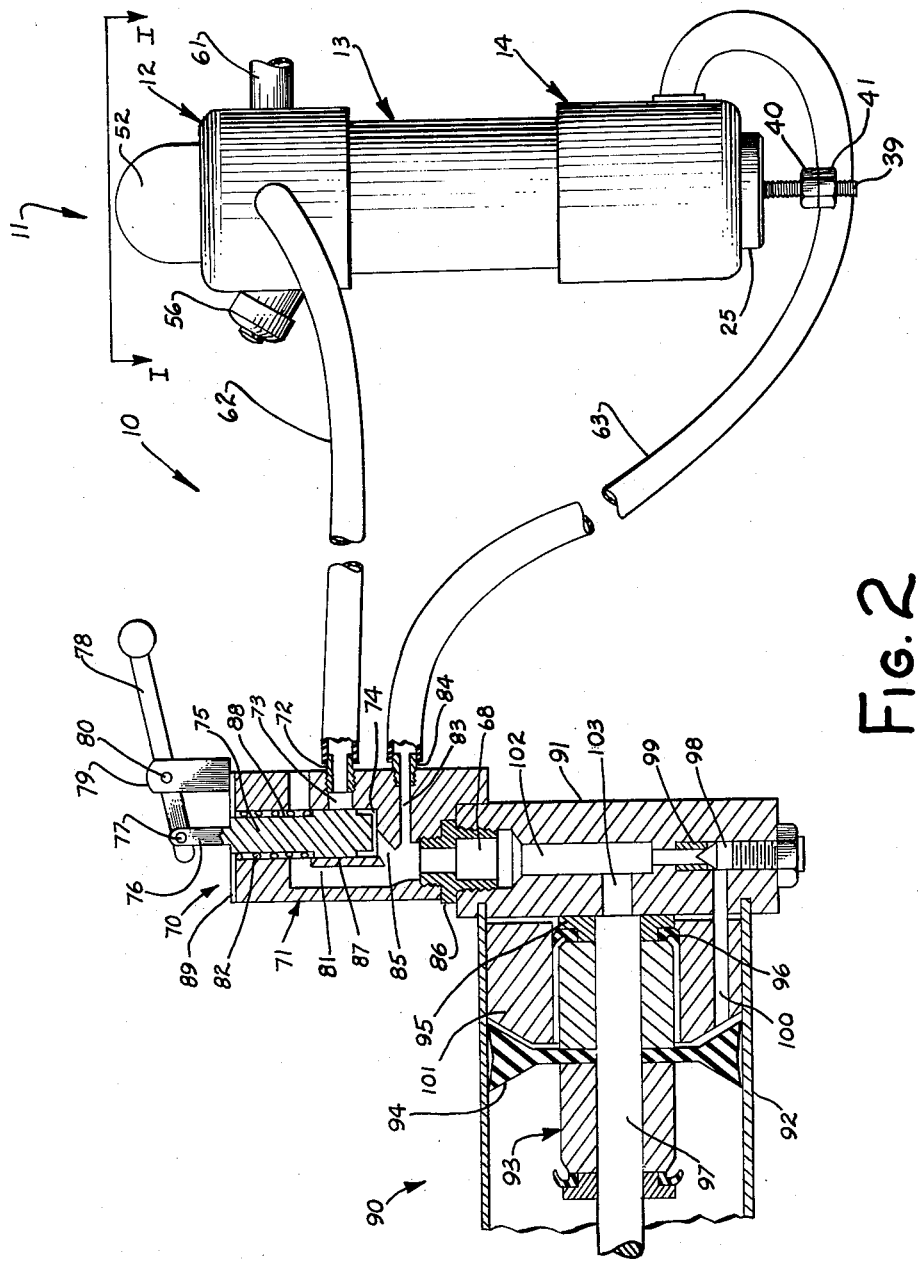
FIG. 2 is a combination side elevational view of the intermittent pressure lubricator, and a cross sectional view of the control valve and a portion of a pneuamtically operated air valve, and also shows the lines interconnecting the two devices.

Referring now specifically to the drawings, FIG. 2 shows the intermittent injector system indicated generally as 10.

Figure 1:
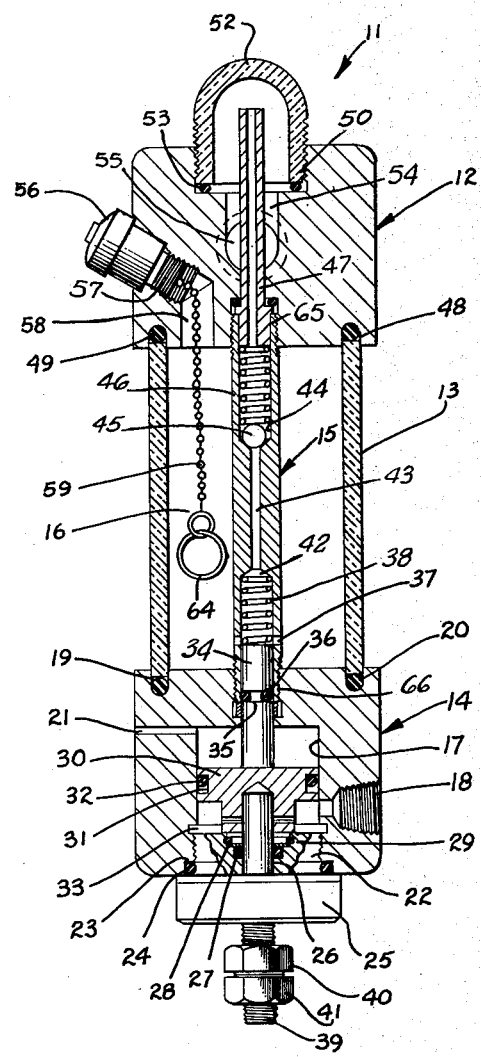
FIG. 1 is a cross sectional view taken along the plane I—I of FIG. 2.

This assembly 10 includes the FIG. 1 intermittent pressure injector, generally 11, which is composed of a head 12, sleeve 13, base 14 and stud 15 which joins the head and base together upon the sleeve 13 to form a reservoir 16. The base includes a piston and plunger for supplying liquid from the reservoir to the fluid supply passageway 55 extending through the injector 11. A main supply line 62 supplies fluid to the main control valve 70 which regulates when the mixture will flow to the fluid operated device, generally 90. The line 63 bleeds a certain amount of fluid from the channel which supplies actuating pressure to the air motor, and conveys it to the intermittent injector 11 to actuate the piston 16 thereof to in turn supply the main fluid line with a measured portion of liquid. This is controlled by the control valve 70, the operation of which will be explained more fully hereinafter.

FIG. 1 of the drawings shows the specific details of the intermittent injector 11. The head portion 12 of the intermittent injector is a generally cylindrical shaped member having a passageway 55 extending transversely therethrough. The passageway 55 is provided with threads on either end which are adapted to threadedly engage a fitting secured to the end of the supply inlet tube 61 and one end of the supply outlet tube 62. The bottom surface of the cylindrical head 12 is provided with an annular groove 48 near the outer edge thereof. The groove 48 houses a seal 49 which is adapted to abut the sleeve 13 which fits within the groove 48. The seal 49 provides a fluid tight and liquid tight joint between the sleeve 13 and the head 12.

The top surface of the cylindrical head 12 is provided wtih a threaded opening 50. Communicating with the threaded opening 50 is a centrally disposed liquid channel 54 which also comunicates with the fluid passageway 55. A generally dome shaped sight glass 52 is provided with threads at its lower end, and engages the threads of threaded opening 50. The end of the sight glass 52 engages a sight glass seal 53 which rests against the bottom of threaded opening 50. The sight glass seal 53 provides a fluid tight and liquid tight seal between the head 12 and sight glass 52.

A refill plug port 57, partially threaded, is disposed at an angle within the head 12 so that liquid poured therein will be gravity-fed. A duct 58 communicates with the refill port 57, and also with the reservoir 16, forming a pathway for filling the reservoir with liquid. A refill plug 56 is threadedly engaged within the threaded portion of port 57 to provide a closure means for the reservoir. Secured to the refill plug 56 is a plug retainer chain and ring 59. The chain passes through the duct 58 and into the reservoir 60. The ring 64 is of greater diameter than the duct 58 and is attached to the chain 59 to prevent loss of the plug while refilling the lubricator.

A stud aperture 65 is centrally disposed within the bottom of the head 12 and communicates with the passageway 55. The lower end of the stud aperture 65 is threaded to receive the threaded end of the stud 15.

The base 14 of the intermittent injector is also a generally cylindrical member. The upper surface of this member is provided with an annular groove 19 which appears near the outer edge thereof. The groove 19 houses an O-ring seal 20. The other end of sleeve 13 fits within the annular groove 19 and the end thereof engages the seal 20 to form a fluid tight and liquid tight joint between the base 14 and the sleeve 13.

The opposite end or bottom of the base 14 is provided with a cylinder bore 17. The lower end of the bore 17 is threaded to threadedly engage a base plug 22. A cap 25 is formed integral with the plug 22 and is of a diameter so as to engage the bottom surface of base 14. A seal 24 is positioned between a shoulder formed on the bottom of the base 14 and the cap 25. When the plug 22 is drawn tight, a seal is formed between the cap 25 thereof and the shoulder of the base 14.

An annular relief 33 is disposed within the cylinder bore 17 at the upper end of the threaded portion thereof.

A bleed inlet port 18 extends transversely through the wall of base 14 and communicates with the cylinder bore 17. The inlet port 18 is positioned so as to actuate a piston 30 which operates within the cylinder bore 17.

A pressure relief opening 21 is positioned at the opposite end of the cylinder bore 17 to discharge any fluid which may become trapped behind the piston.

Centrally located within the top surface of the base member 14 is a base stud aperture 66. The stud aperture 66 extends through the base 14 and communicates with the base cylinder bore 17. A portion of the stud aperture 66 is threaded to engage the threaded portion of stud 15.

The piston 30 is adapted to reciprocate within the cylinder bore 17. An annular groove 31 is machined within the cylinder wall engaging surface of the piston and is provided with a seal 32 to form a fluid tight seal between the piston and the walls of the cylinder bore 17.

Secured to the bottom of the piston 30, in any well-known manner, is a piston screw 39. The piston screw 39 extends downwardly and through an opening 26 formed in the plug 22 and its cap 25. The piston screw 39 extends for some distance beyond the cap 25 and has the lower portion thereof threaded. An adjusting nut 40 and lock nut 41 are threadedly engaged on the piston screw 39 and provide a means of adjusting the length of the stroke of piston 16. The adjusting nut 40 will engage the bottom of cap 25 to limit the stroke of the piston. The plug opening 26 is enlarged as it opens into the cylinder bore 17 to provide a seat for seal 27 which surrounds the piston screw 39. The seal 27 is held in place by a flat washer 28 which also surrounds the piston screw 39, and by a snap ring 29 which is snapped within a groove formed within the plug 22. The seal 27 prevents fluid from escaping past the piston screw 39.

Abutting the other side of the piston 16, directly opposite the piston screw 39, is a plunger 34. The plunger is of a length so as to extend into a plunger bore formed within the stud 15, now to be explained.

The stud 15 is an elongated, hollow, cylindrical member, threaded on either end. The threaded ends of stud 15 are threaded into the threaded portions of head stud aperture 65 and base stud aperture 66. When the head 12 and base 14 are threaded on the stud 15, the sleeve 13 is clamped between the two members forming the reservoir 16. The sleeve 13 fits within the groove 48 of head 12 and the groove 19 of base 20, as previously described.

The stud 15 is a hollow member having a plunger bore 42 formed at the base engaging end thereof and a valve housing 44 formed at the head engaging end thereof. A restricted passageway 43 is formed intermediate the plunger bore 42 and valve housing 44.

The plunger 34 extends from the base cylinder bore 17 into the plunger bore 44 and is adapted to reciprocate within the plunger bore. It is provided with an annular groove 35 within the plunger bore engaging walls thereof. A liquid seal 36 is seated within the groove and engages the walls of the plunger bore 42 to prevent liquid from the reservoir 60 from entering the cylinder bore 17. Perforations 37 extend transversely through the walls of the stud 15 in the vicinity where the stud engages the base 14. The perforations 37 allow liquid from the reservoir 60 to escape into the plunger bore 42 when the plunger 34 is in the FIG. 1 or retracted position. Notice that the perforations 37 are positioned slightly above the end of the plunger 34 so that liquid entering the plunger bore 42 is above the end of the plunger 34.

A compression spring 38 is positioned within the plunger bore 42 between the end of plunger 34 and the one end of restricted passage 43. The spring 38 urges the plunger 34 downwardly so that it assumes the retracted position shown in FIG. 1.

A liquid tube 47 is press fitted within the end of stud valve housing 44. The liquid tube 47 extends through the head stud aperture 65 and passes through the passageway 55, liquid channel 54 and into the head threaded opening 50.

Disposed within the valve housing 44, at the lower end thereof, is a ball check valve 45. The ball check valve 45 is adapted to seat against the valve housing end of restricted passage 43. A compression spring 46 is disposed within the valve housing 44 and engages the bottom of liquid tube 54 and the ball check valve 45 to urge it into engagement with the end of the restricted passageway 43, which forms a valve seat.

The above described intermittent injector, as shown in FIG. 1, is connected to the control valve 70 of air motor 90 by tube 62 which connects with the outlet of the intermittent injector 11 and to the control valve inlet port 73. A connector 72 is threadedly engaged in the control valve inlet port 73 and is secured to tube 62.

A bleed line tube 63 is connected to a bleed duct 83 in the control valve 70 by a connector 84 which is threadedly engaged in the bleed duct 83. The other end of the bleed line tube 63 is connected to the bleed inlet port 18 of the intermittent injector base 14.

The control valve 70 is a conventional spool type valve having a spool valve bore 74 disposed centrally within the control valve body 71. The inlet port 73, the exhaust channel 81 and control valve outlet port 85 all communicate with the spool valve bore 74.

A spool valve member 75 is reciprocally mounted within the spool valve bore 74. The spool valve member 75 has a port closing collar 87 which is adapted to prevent communication of inlet port 73 with spool valve bore 74 in one position and prevents the escape of air to the atmosphere through discharge channel 81 in another position. The spool valve 75 has a reduced portion 88 which extends upwardly from the collar 87. A spool valve arm 76 is formed integral with the shank 88 and projects above the body 71 of the valve.

A compression spring 82 surrounds the shank 88 of the spool valve and engages the collar 87 thereof, and a plate 89 which is secured to the top of valve body 71 in any well-known manner. The spring 82 urges the spool valve 75 into a position so as to close inlet port 73.

The valve actuator 78 has a pivotal connection 80 on fulcrum 79 which is secured to the cover plate 89 and extends upwardly from one of the side edges thereof. The actuator 78 extends beyond the fulcrum 79 and connects with spool valve arm 76 at pivotal connection 77. Compression of actuator 78 causes the spool valve 75 to move upwardly and the collar 87 thereof to close exhaust channel 81 and open inlet supply port 73.

Control valve 70 is connected to air motor 90 by means of connector 86 which threadedly engages control valve 70 and the end 91 of fluid motor 90 now to be explained.

The fluid motor 90 is only partially shown, since it is not an essential part of this invention. The fluid motor 90 may be of the double acting type or be of the type that has a spring return. Within the broadest scope of this invention, the intermittent injector 11 can be used with most of any type of fluid operated device.

The fluid motor 90 has a sleevelike housing 92 which is welded or secured in some other manner to the fluid motor end 91. An annular housing collar 101 is fixed to the housing 92 adjacent the fluid motor end 91. The fluid motor end 91 has a fluid inlet channel 102 which communicates with the passage 68 formed in connector 86, which in turn communicates with the control valve outlet port 85. A centrally disposed piston feed duct 103 extends transversely from the fluid inlet channel 102. The piston feed duct 103 conveys fluid to the fluid motor pistons to be described more fully hereinafter. The fluid inlet channel 102 extends completely through the end 91 and has a threaded portion at the opposite end thereof which receives a needle valve 98. Disposed within the fluid inlet channel 102 is a sleeve 99 which acts as a valve seat for the needle valve 98.

The diaphragm feed passage 100 extends in a direction normal to the fluid inlet channel 102 in the vicinity of needle valve 98. The diaphragm feed passage 100 also extends through the housing collar 101 for purposes which will be described more fully hereinafter. The needle valve 98 regulates the amount of fluid from fluid inlet channel 102 to the diaphragm feed duct 100.

Slidably mounted within the fluid motor housing 90 is a piston 93. An actuator rod 97 supports the piston 93 and a diaphragm 94 which is sandwiched between the ends of piston 93. The actuator rod 97 operates some mechanism (not shown). The end of the piston 93 is provided with a bumper cushion 95 which engages the end 91 of the fluid motor to cushion the piston upon the return stroke.

An annular flexible seal 96 is secured between the end of the piston 93 and the bumper cushion 95. The seal engages the annular housing collar 101 to provide a seal between the piston 93 and the housing collar. Thus, when fluid is admitted through piston feed duct 103, it will act against the piston and cause it to move.

The diaphragm 94 is made of a resilient material such as rubber and engages the inside wall of housing 92. The diaphragm 94 forms a seal between the housing and the diaphragm. When fluid is admitted through diaphragm feed duct 100, it will assist in actuating the piston 93, since the diaphragm is secured to the piston. The needle valve 98 regulates the amount of fluid applicable to the diaphragm 94, which in turn regulates the speed of travel of the piston 93. Thus, by regulating the valve 98, the piston 93 can be caused to move quickly or at a slow rate of speed.

*Operation*

To put the intermittent injector into operation, it is necessary to connect it in a supply line. It may be connected to an inlet supply line such as 61 and an outlet supply line such as 62 which is in turn connected to a valve such as control valve 70. The port 18 is then connected by a bleed line such as 63 to a bleed duct such as 83 to supply bleed fluid to the intermittent lubricator. The bleed duct 83 should be taken from the discharge side of the control valve. The reservoir 16 is filled with liquid by removing plug 56 and when the reservoir is filled, the plug replaced, then the intermittent pressure injector system 10 is ready for operation.

Fluid from the main supply line passes through inlet tube 61 through passageway 55 of lubricator head 12, through outlet supply tube 62 and into control valve inlet port 73. When the spool valve 75 is in the down or FIG. 2 position, the fluid is prevented from flowing into cylinder bore 74 since the control valve inlet port 72 is covered by collar 87 of the spool valve.

Upon operation of actuator 78 the spool valve 75 is raised uncovering inlet port 73, allowing fluid from the port 73 to pass through spool valve cylinder bore 74 through control valve outlet 85, through passage 68 of connector 86, through fluid inlet channel 102, through piston feed duct 103, and through diaphragm feed passage 100 provided needle valve 98 is set to allow passage of fluid thereby.

At the same time the valve spool collar 87 covers exhaust channel 81 and prevents fluid from escaping from the channel to the atmosphere.

The bleed duct 83 is open, and fluid from the control valve outlet 85 will be bled off and travel through the bleed tube 63 to the cylinder bore 17 in the base of intermittent injector 11.

Before the operation of actuator 78 and thus the movement of spool valve 75, there is no fluid pressure acting against the piston 30 within cylinder bore 17. Therefore, the plunger spring 38 positions the plunger 34 and piston 30 abuts thereto in the retracted position shown in FIG. 1. In this position the plunger 34 does not cover the perforations 37 and liquid is allowed to flow from the reservoir 60 into the plunger bore 42.

When the bleed fluid reaches the cylinder bore 17, as previously described, the piston 30 is extended or moved upwardly due to the bleed fluid pressure acting thereupon. Since the plunger 34 abuts the piston 30, the plunger will also be extended. Upon extension of the plunger, the liquid is trapped momentarily within the plunger bore 42 since the walls of the plunger will cover the perforations 37 after being extended a small distance. As the piston and plunger continue to move, the liquid trapped within the plunger bore 42 will travel through restriction 43 forcing the ball check valve 45 off its seat, and the liquid will be conveyed through the ball check valve housing 44, the oil tube 47, and then to fluid passageway 55 via the head opening 50 and the liquid channel 54.

The ball check valve 45 allows forward flow of the liquid from the restriction 43 but prevents liquid from flowing back into the restriction.

As long as the spool valve 75 remains in a position so that inlet port 73 is open, fluid is bled through the bleed duct 83 and is conveyed by tube 63 to the cylinder bore 17. Likewise, the fluid pressure within cylinder bore 17 remains constant. Thus, the piston 30 and plunger 34 remain in the extended position so that plunger 34 covers the perforations 37. As long as perforations 37 are covered, the liquid within reservoir 60 cannot enter the plunger bore 42 to be conveyed to the passage 55.

When the fluid motor operator 78 is released, the return spring 82 will urge the spool valve 75 downwardly and close inlet port 72, and at the same time open exhaust channel 81 to atmosphere. Since the bleed duct 83 is associated with the exhaust channel 81, the fluid pressure within cylinder bore 17 will also be exhausted to atmosphere via the tube 63 and exhaust channel 81.

Plunger spring 38 will now urge the plunger 34 and piston 30 into the retracted position. Plunger 34 will uncover perforations 37, and again allow liquid to enter the plunger bore 42. The intermittent injector is now ready to discharge another measured portion of liquid into the fluid stream, should the fluid motor 90 be again actuated as previously described.

A cycle has now been completed. It can be seen that upon each actuation of the operator 78, a measured portion of liquid will be conveyed to the fluid stream 55, but only one measured portion will be discharged so long as the fluid motor remains actuated.

The amount of liquid pushed past the ball check valve 45 can be controlled by the length of stroke of plunger 34. If the adjusting nut 40 is set so that the stroke is long, more liquid will be pushed past the ball check valve 45. On the contrary, if the adjusting nut 40 is adjusted so that only a short stroke is available a small amount of liquid will be pushed by the ball check valve 45.

Figure 3:
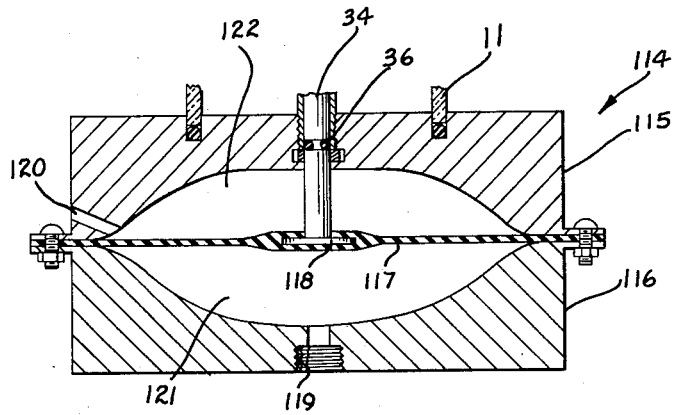
FIG. 3 is a cross sectional view of a modified form of injector base.

FIG. 3 shows a modified form of injector base and is designated generally as 114. The top portion of the modified form of injector is identical to the top portion of the injector 11 shown in FIG. 1.

The base 114 has an upper base portion 115 and a lower base portion 116. A flexible diaphragm 117 is clamped between flanges formed on the upper and lower base portions 115 and 116 respectively by fasteners which extend therethrough. An inlet port 119 is formed within the lower base portion and communicates with the area 121 which is formed between the bottom side of the diaphragm 117 and the dish-shaped inner surface of the lower base portion. A relief port 120 extends through the upper base portion 115 and communicates with the area 122 formed between the top side of the diaphragm 117 and the dish-shaped inner surface of the upper base portion 115. The plunger 36 is formed integral with or secured to a diaphragm plate 118. The diaphragm plate 118 is embedded within the center portion of the diaphragm 117. The diaphragm 117 is vulcanized to the plate 118.

The modified form of injector operates in a similar manner to the injector 11 shown in FIG. 1. Bleed air is conveyed to the inlet port 119 at predetermined intervals, and each time pressure is applied to the diaphragm 117, the plunger 36 will be extended injecting a portion of liquid into the flow stream passing through the injector head. The injector base 114 does not have means for adjusting the stroke of the piston as shown in the FIG. 1 embodiment; however, within the broadest aspect of the invention, the diaphragm 117 could be provided with a similar stroke limiting mechanism.

Figure 4:
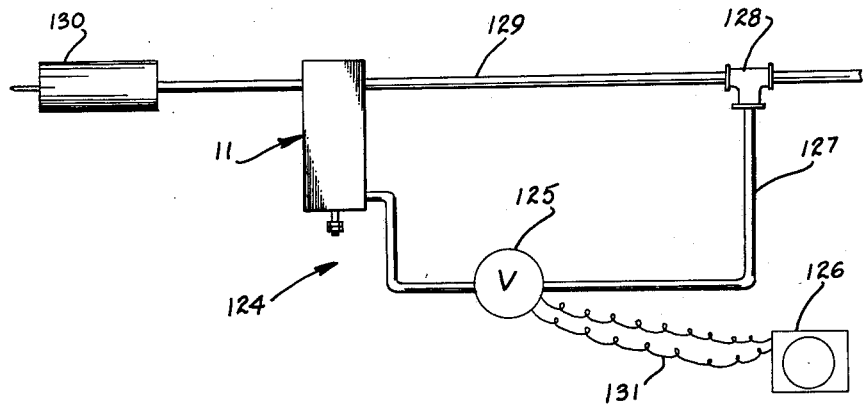
FIG. 4 is a schematic diagram of the injector used in a cycling system.

FIG. 4 shows a schematic diagram of another system, generally designated 124, in which the injectors of FIGS. 1 and 3 may be incorporated.

This system is basically similar in operation to the system of FIG. 2; however, differs in the respect that the injector is operated cyclically. The injector 11 having a base 14 or 114 is positioned in a main supply line 129 so that a fluid stream is conveyed through the head of the injector. A T fitting is spliced within the supply line 129 and leads to a bleed line 127. The bleed line 127 passes through a three-way valve 125 and connects with the inlet port 18 or 119 of the desired injector base. A timer 126 is connected to the valve 125 by appropriate wires 131. The timer 126 and valve 125 may be interconnected with the main control valve means whereby cycling starts upon actuation thereof. The timer 126 and valve 125 then becoming components of the control means. Regardless of whether or not the timer 126 and valve 125 are interconnected with the main control valve means, it may be positioned upstream or downstream of the injector in the FIG. 4 system.

A fluid operated device 130 is connected to the main supply line 129 downstream of the injector.

The system 124 is designed to be operated at predetermined intervals. The timer 126 is set to shift the valve 125 at intervals of, for instance, every fifteen seconds. Bleed fluid from line 129 is allowed to flow through the valve 125 and to the injector 11 each time the valve is actuated.

The valve 125 is constructed so as to discharge the bleed air to atmosphere upon the completion of the stroke of plunger 54.

A spring such as 38 returns the plunger 34 to its initial position and also returns the diaphragm 117 or the piston 30 depending on the type of injector base used. The injector is then ready for another cycle of operation.

The timer 126 can be set to actuate the valve 125 at short intervals or intervals of great length. Thus, the amount of liquid discharged into the flow stream of the main line 129 can be precisely controlled by the timer 126. This system is particularly adaptable to the injection of lubricant, or for injecting alcohol into a gas stream, or for other similar uses.

The above-described intermittent injector provides an air line injector which will inject a desired amount of liquid into the fluid stream each time the fluid operated mechanism is actuated. With such an intermittent type injector, the fluid operated device is provided with an adequate supply but not oversupplied. Thus, the intermittent injector disclosed herein is an economical and simple mechanism for properly supplying a fluid operated device with quantities of liquid. This intermittent injector has a further advantage in that it is adaptable for use with any type of fluid operated device which has a control mechanism for starting and stopping the device.

While a preferred embodiment of this invention has been described together with several modifications thereof, it will be understood that other modifications and improvements thereof may be made. Such of the modifications and improvements as incorporate the principles of this invention are to be considered as included in the hereinafter appended claims unless these claims by their language expressly state otherwise.

We claim:

1. An intermittent pressure injector comprising: a head having a fluid passage extending therethrough; a base; an elongated cylindrical sleeve; a hollow stud threaded at opposite ends and threadedly engaging said head and said base to clamp said sleeve therebetween and form a reservoir; said stud having a plunger bore at the base engaging end thereof and communicating with a cylinder bore formed in said base, a plunger slidably mounted in said plunger bore and a piston formed integral therewith slidably mounted in said cylinder bore; a bleed inlet port adapted to receive bleed fluid upon the operation of a fluid operated device to extend said piston and plunger, perforations in said plunger bore near said base and communicating with said reservoir whereby liquid may enter said plunger bore, said plunger upon being extended shutting off the flow of liquid through said perforations and forcing the liquid in said plunger bore through said hollow stud member to be injected into said fluid passage by liquid conveying means formed in said head.

2. An intermittent pressure injector as in claim 1 wherein said hollow stud has a check valve housing formed in the head engaging end thereof, and a check valve operative within said housing to pass liquid from said plunger bore and to prevent return of liquid to said plunger bore.

3. An intermittent pressure injector as in claim 1 wherein the length of stroke of the plunger regulates the amount of liquid injected into the valve housing; a piston screw formed integral with said piston and extending below said base, an adjusting nut threaded on said screw and adapted to engage the base to limit the length of said plunger stroke.

4. An intermittent pressure injector as in claim 2 wherein said liquid is conveyed from said valve housing by a conduit passing through said head to an opening in said head, said liquid being conveyed to said passageway by a liquid channel communicating with said head opening in said passageway.

5. An intermittent pressure injector comprising: a head having a fluid passage extending therethrough; a base; an elongated cylindrical sleeve; a hollow stud secured to said head and said base to clamp said sleeve therebetween and form a reservoir; said stud having a plunger bore at the base engaging end thereof and communicating with a diaphragm chamber formed in said base, a plunger slidably mounted in said plunger bore and a diaphragm formed integral therewith and mounted in said diaphragm chamber, a bleed inlet port adapted to receive bleed fluid upon the operation of a fluid operated device to flex said diaphragm and extend the plunger, perforations in said plunger bore near said base and communicating with said reservoir whereby liquid may enter said plunger bore, said plunger upon being extended shutting off the flow of liquid through said perforations and forcing the liquid in said plunger bore through said hollow stud member to be injected into said fluid passage by liquid conveying means formed in said head.

References Cited in the file of this patent

UNITED STATES PATENTS

| | | |
|---|---|---|
| 271,077 | Jewell | Jan. 23, 1883 |
| 271,238 | Heston | Jan. 30, 1883 |
| 296,213 | Parshall | Apr. 1, 1884 |
| 1,633,356 | Albertine | June 21, 1927 |
| 1,760,902 | Grattan | June 3, 1930 |
| 1,762,198 | Shone | June 10, 1930 |
| 2,598,271 | Klosterman | May 27, 1952 |
| 2,698,604 | Edwards | Jan. 4, 1955 |
| 2,738,902 | Le Clair | Mar. 20, 1956 |
| 2,758,575 | Wampach | Aug. 14, 1956 |

FOREIGN PATENTS

| 18,909 | Great Britain | July 7, 1904 |